(12) United States Patent
Wilson et al.

(10) Patent No.: US 9,188,281 B2
(45) Date of Patent: Nov. 17, 2015

(54) ADJUSTING DEVICE FOR MAKING X-Y ADJUSTMENTS FROM A SINGLE POINT

(71) Applicant: Morrison Timing Screw Co., Glenwood, IL (US)

(72) Inventors: Nick Wilson, Chicago, IL (US); Andrew Kazen, Homewood, IL (US)

(73) Assignee: Morrison Timing Screw Co., Glenwood, IL (US)

( * ) Notice: Subject to any disclaimer, the term of this patent is extended or adjusted under 35 U.S.C. 154(b) by 195 days.

(21) Appl. No.: 14/032,942

(22) Filed: Sep. 20, 2013

(65) Prior Publication Data

US 2015/0083871 A1    Mar. 26, 2015

(51) Int. Cl.
*A47H 1/10*    (2006.01)
*F16M 13/02*    (2006.01)

(52) U.S. Cl.
CPC .................... *F16M 13/022* (2013.01)

(58) Field of Classification Search
USPC ........ 248/276.1, 284.1, 274.1, 651, 653, 654, 248/323, 327, 333
See application file for complete search history.

(56) References Cited

U.S. PATENT DOCUMENTS

| | | | | |
|---|---|---|---|---|
| 4,240,660 A | * | 12/1980 | Roth et al. | 294/81.2 |
| 4,417,522 A | * | 11/1983 | Theurer et al. | 104/7.2 |
| 7,147,194 B2 | * | 12/2006 | Rivers et al. | 248/317 |
| 2007/0235615 A1 | * | 10/2007 | Tkachenko et al. | 248/327 |

* cited by examiner

*Primary Examiner* — Steven Marsh
(74) *Attorney, Agent, or Firm* — Quinn Law Group, PLLC.

(57) ABSTRACT

An adjusting device for making x-y adjustments of a repositionable member from a single point includes first and second extendable members each defining an extension axis and including an extension rod, an extendable portion operatively attached to and adjustable relative to the extension rod along the extension axis to an extended length, and a clamping member attached to the extendable portion and configured to receive a rotatable member including the repositionable member. The clamping members define a rotation axis perpendicular to the extension axes and are lockable to prevent rotation of the rotatable member around the rotation axis. The adjusting device includes a synchronizing mechanism connected to the first and second extendable members and operable to simultaneously adjust the extended length of the first and second extendable portions such that the extended length of the first extendable portion and the extended length of the second extendable portion are equal.

20 Claims, 5 Drawing Sheets

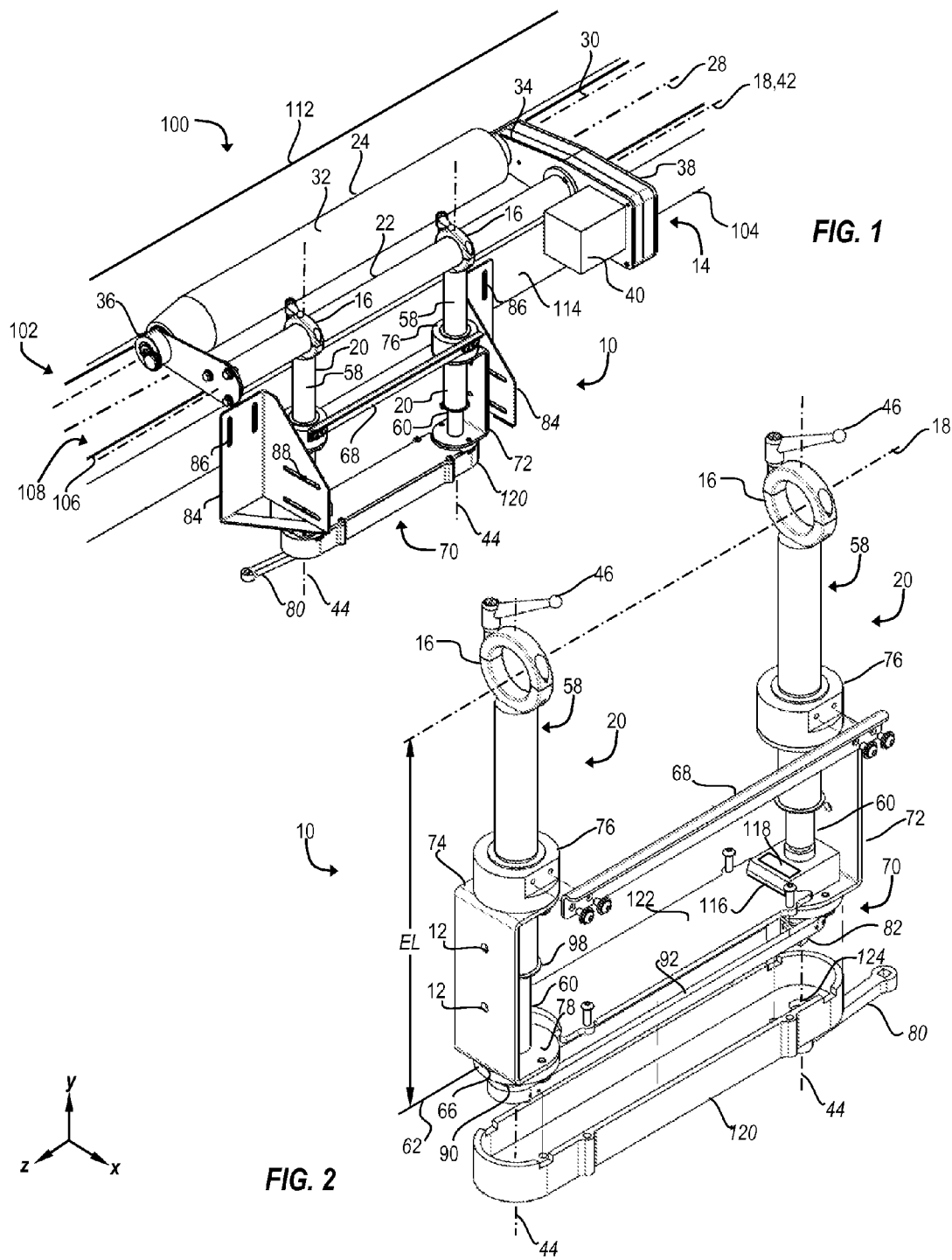

ADJUSTING DEVICE FOR MAKING X-Y ADJUSTMENTS FROM A SINGLE POINT

TECHNICAL FIELD

The present invention relates to an adjusting device for adjusting a repositionable member in two directions from a single point.

BACKGROUND

A timing screw can be used to progress and guide objects being fed via a conveyor, as in a feed conveyor system. Timing screws may be helically shaped such that objects being guided by the timing screw are spaced at intervals defined by the pitch of the helix. Prior to operation of the timing screw and feed conveyor system the position of the timing screw must be adjusted relative to one or more datums or reference points defined by the conveyor, such as the longitudinal centerline of the conveyor belt, the surface of the conveyor belt, a guide rail or sidewall of the conveyor, etc. The timing screw position may be adjusted, for example, to align the longitudinal axis of the timing screw relative to one or more conveyor reference points, and/or to adjust the timing screw position for the size and shape of the object being conveyed, such that sufficient clearance is provided between the timing screw and the conveyor belt, and between the timing screw and a guide rail or side wall of the conveyor, to allow conveyance of the objects through the timing screw at spacing intervals defined by the timing screw and such that objects being conveyed do not hang up, jam or otherwise interfere with the conveyor and timing screw operation.

Adjustment and alignment of the timing screw may require vertical and horizontal adjustments to the timing screw, alignment of the timing screw axis relative to the centerline of the conveyor belt, etc. The timing screw may be fixtured in a timing screw assembly for positioning the timing screw relative to the conveyor, where adjustment of the timing screw position may include the adjustment of multiple and/or unrelated elements of the timing screw assembly and/or fixturing. The timing screw assembly may include, for example, a first pair of adjustment elements, such as a pair of slide bars, which must be individually adjusted to align the axis of the timing screw to the conveyor in the X-axis. The timing screw assembly may include another element, such as an Acme screw, which must be then individually adjusted to set a position relative to the conveyor in the X-direction. The timing screw assembly may have a second pair of adjustment elements, such as another pair of slide bars which must be individually adjusted to align the timing screw axis in the Y-direction, then another Acme screw for setting the position relative to the conveyor in the Y-direction. Each of these six adjustments are made independent of the other, such that multiple adjustments may be need to achieve positioning of the timing screw to specific X- and Y-coordinates and in alignment with the conveyor centerline. Multiple adjustment tools may be required as well as multiple counters or other gages to indicate positioning of each element.

Performing multiple and/or unrelated adjustments to reposition the timing screw increases set-up time and the potential for set-up error and/or misalignment of the timing screw to the conveyor belt which may result in misfeeding and jamming of objects being conveyed, uneven wear of the timing screw, etc. Unrelated adjustments, for example, adjusting the timing screw first in an X-direction using a first adjusting element, then adjusting the timing screw in a Y-direction using a different adjusting element may result in uncoordinated adjustments such that readjustment may be required to obtain a final desired position or alignment, increasing set-up time and the potential for misalignment. Different sizes and/or shapes of objects may be fed through the conveyor system, such that with each change in the size or shape of the fed object, the timing screw must be repositioned relative to the conveyor belt to accommodate the change in size or shape. In some instances, the timing screw must be removed and replaced with a different timing screw corresponding to the fed object, and the replacement timing screw must be set-up and/or repositioned as required for the fed object. Production time and efficiency is lost during timing screw repositioning and/or changeover.

SUMMARY

An adjusting device for making x-y adjustments of a repositionable member from a single point is provided herein. The single point is defined by a rotation axis established by the adjustable device coincident with the longitudinal axis of a rotatable member received by the adjusting device, where the rotation axis is a z-direction axis. The repositionable member includes or is attachable to a rotatable member which is received by the adjusting device such that the repositionable member can be adjusted in the x-y directions relative to the rotation axis (z-direction) to a desired or predetermined location by adjusting the position of the rotatable member using the adjusting device. The adjusting device is arranged to receive the rotatable member in a first orientation defining an initial rotation angle originating from the rotation axis, to rotate the rotatable member relative to the rotation axis to another rotation angle which may be a predetermined rotation angle, and to adjust the position of the rotatable member in a direction perpendicular to the rotation axis of the rotatable member, e.g., adjust the position of the rotatable member vertically relative to the rotation axis in a horizontal orientation.

The adjusting device includes first and second extendable members, each extendable member including a clamping member at a first end to receive the rotatable member. The extendable members are aligned such that the clamping members define a rotation axis and receive the rotatable member with the rotation axis in a horizontal orientation relative to vertical extension axes defined by the extendable members. The extendable members can be extended in a vertical direction, e.g., perpendicular to the rotation axis, to change the vertical position of the rotatable member and the position of the repositionable member included with and/or attached to the rotatable member. A synchronizing mechanism is provided to concurrently extend the extendable members at the same rate such that the extended lengths of the first and second extended members remain the same during extension of the extendable members and the rotation axis is maintained in a perpendicular orientation to the extension axes of the extendable members. The clamping members are lockable such that in an unlocked condition the rotatable member and the repositionable member included with or attached thereto can be rotated around the rotation axis, thereby adjusting the position of the repositionable member in the x-direction and y-direction corresponding to a rotation angle, which may be measured relative to the vertical extension axes. The clamping members may be locked to retain the rotatable member at a predetermined rotation angle corresponding to x-direction and y-direction positions or coordinates.

The adjusting device may be mounted to a mounting surface using an adjustable bracket, where the adjustable bracket may be adjusted vertically (in the y-direction) and/or horizontally (in the x-direction) to adjust the position of the adjusting device relative to the mounting surface and/or to extend the range of positions to which the repositionable member can be located using the adjusting device.

In an illustrative example, the adjusting device is used for adjusting the location of a timing screw, also known as a feed screw, relative to a conveyor surface of a feed conveyor system. The timing screw is attachable to a timing screw frame including a rotatable member, to form a timing screw assembly. The adjusting device is adjustably mounted to the conveyor and is configured to receive the rotatable member of the timing screw assembly and to reposition the timing screw (the repositionable member) relative to the centerline of the conveyor belt and/or relative to the surface of a guide rail defining a clearance gap between the timing screw and the guide rail into which objects progressed by the timing screw and conveyor are fed.

A method for adjusting the repositionable member using the adjusting device is provided. In one example, the method includes adjusting a timing screw relative to a conveyor and conveyor belt using the adjusting device, wherein the adjusting device is mounted to a surface defined by the conveyor.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of a feed conveyor system including a timing screw assembly and an adjusting device;

FIG. 2 is an exploded schematic perspective view of the adjusting device of FIG. 1;

DETAILED DESCRIPTION

Figure 3:
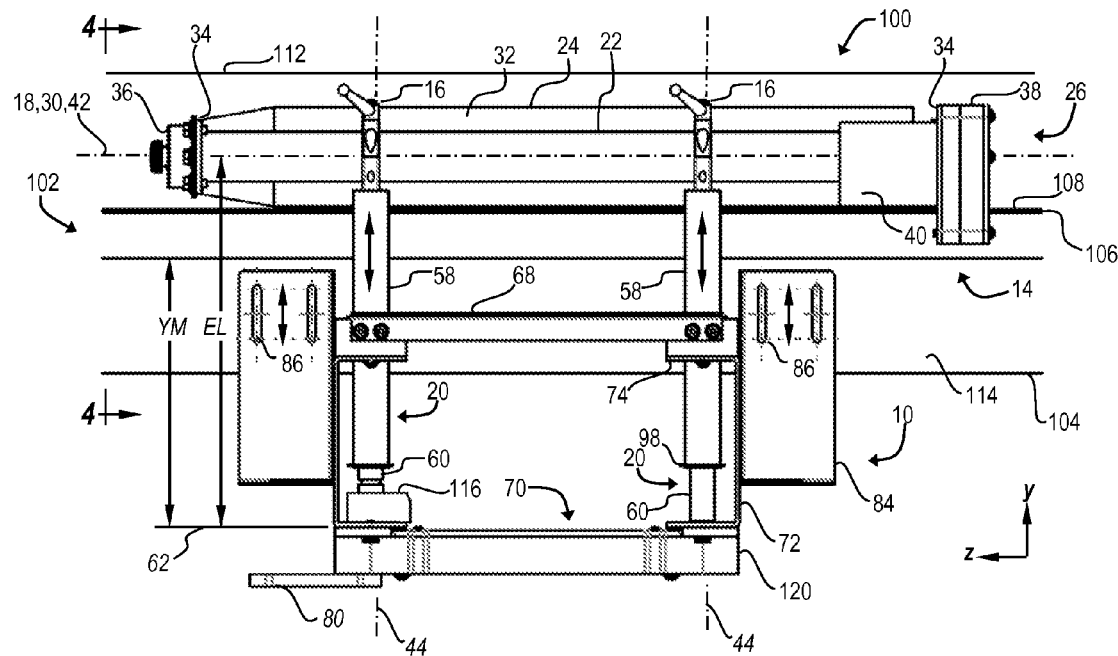
FIG. 3 is a schematic side view of the feed conveyor system of FIG. 1 including the adjusting device.

Referring to the drawings wherein like reference numbers represent like components throughout the several figures, the elements shown in FIGS. 1-10D are not necessarily to scale or proportion. Accordingly, the particular dimensions and applications provided in the drawings presented herein are not to be considered limiting. For clarity of illustration the x-y-z coordinate system referred to herein is indicated in the drawings. In the illustrative example, the y-axis direction is referred to as the vertical direction, the x-axis direction is referred to as the horizontal direction, and the z-axis direction is referred to as the longitudinal direction. Where relative terms such as "equal", "parallel" and "perpendicular" are used herein and in the claims, these terms are intended be relative within the manufacturing variation and/or specification tolerances of the components contributing to the characteristics being described. For example, the adjusting device 10 described herein includes first and second extendable members 20 and a synchronizing mechanism 70 to synchronize the extension of the first and second extendable members 20, such that the extended length of the first extendable member 20 is "equal" to the extended length of the second extended member. The term "equal" as used herein and in the claims is to be defined as "equal within the manufacturing variation and/or specification tolerances of the components contributing to the extended length" which may include in the present example configuration the manufacturing variation and/or specification tolerance of the thread forms of the threaded elements 51 of each of the first and second extendable members 20 and/or variation in the mesh of these threaded elements 51 in the extendable members 20 as assembled, variation in placement of the screw bushing 51 in the extendable portion 58 and relative to the position of the clamping member on the extendable portion 58, etc. Similarly, other relative terms such as "parallel" and "perpendicular" as used herein, are defined respectively as "parallel" and "perpendicular" within the manufacturing variation and/or specification tolerances of the components contributing to the characteristics described respectively as "parallel" or "perpendicular" to each other.

An adjusting device 10 for adjusting the location of a repositionable member 24 in two directions is provided herein. A method for adjusting the location of the repositionable member 24 in two directions using the adjusting device 10 is provided herein. In the illustrative example shown in the figures, an adjusting device generally indicated at 10 is shown mounted to a vertical mounting surface 114, which in the example shown is a vertical surface of a conveyor generally indicated at 102. The adjusting device 10 includes extendable members 20 which are extendable in the y-axis direction, also referred to herein as the vertical direction. Each extendable member 20 includes a clamping member 16. The clamping members 16 together define a rotation axis 18 in the z-axis direction, also referred to herein as the longitudinal direction. The clamping members 16 are configured to receive a rotatable member 22, which is rotatable in the clamping members 16 around the rotation axis 18. The rotatable member 22 includes and/or is attached to a repositionable member 24 such that the location of the rotatable member 22 and the repositionable member 24 can be adjusted in the y-axis direction by extension of the extendable members 20. The extendable members 20 are synchronized such that extended lengths of the extendable members 20 are equal, and move the rotatable member 22 in the y-axis direction while maintaining the rotation axis 18 parallel to the z-axis. The rotatable member 22 is rotatable around the rotation axis 18 to concurrently adjust the location of the repositionable member 24 in the x-axis and y-axis directions.

Advantages of the adjusting device 10 disclosed herein include a substantial reduction in the number of components of the device, resulting in a reduction in cost, weight, complexity of operation and total set-up time in comparison to previously known devices, and a substantial reduction in the number of adjustment steps required to achieve positioning of the repositionable member 24 to the desired X- and Y-coordinate positions. The clamping members 16 maintain alignment of the rotation axis 18 during adjustment, such that rechecking and realignment of the rotation axis 18 is not required during the set-up and adjustment sequence. Changes in the X- and Y-coordinate positions can be correlated to a single measurement provided by a rotation counter 116, minimizing the amount of gauging and/or measurement tools required during set-up and adjustment.

Figure 4:
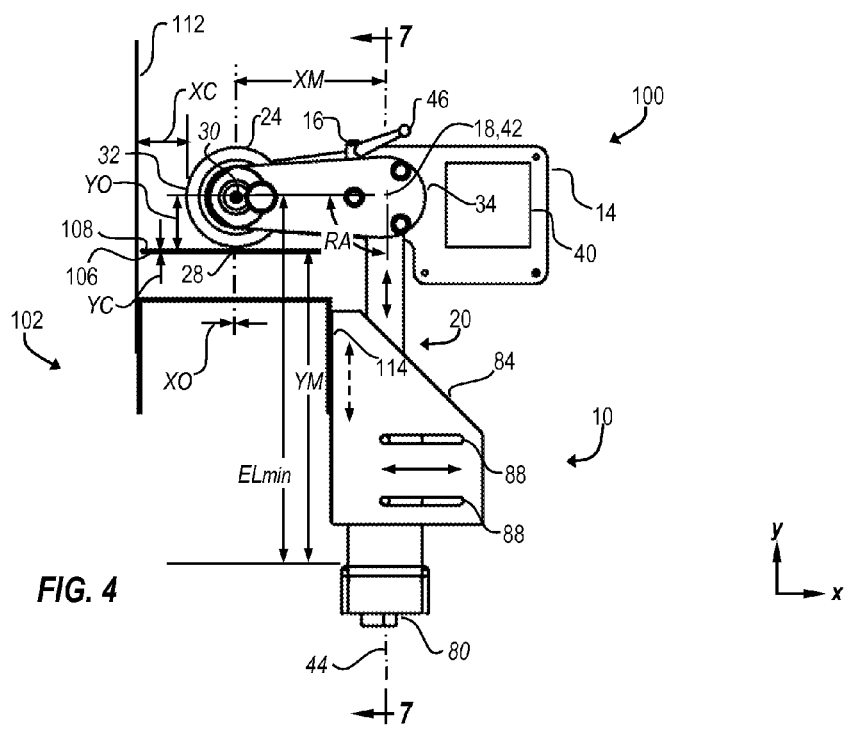
FIG. 4 is a schematic end view of section 4-4 of the feed conveyor system of FIG. 3 including the adjusting device.

In an illustrative example shown in FIG. 1, the adjusting device 10 is included in a feed conveyor system generally indicated at 100 and shown in additional detail in FIGS. 3 and 4. The feed conveyor system 100 includes a conveyor generally indicated at 102, a timing screw assembly generally indicated at 26, and the adjusting device generally indicated at 10 and shown in additional detail in FIG. 2. The conveyor 102 includes a conveyor housing 104 and a conveyor belt 106. The conveyor belt 106 defines a conveying surface 108 upon which objects 110 (shown in phantom in FIG. 10D) to be moved by the conveyor 102 may be placed. The conveyor 102 may further include a conveyor sidewall 112 or guide rail 112 for guiding and/or retaining conveyed objects 110 into contact with the timing screw 24.

Figure 10A:
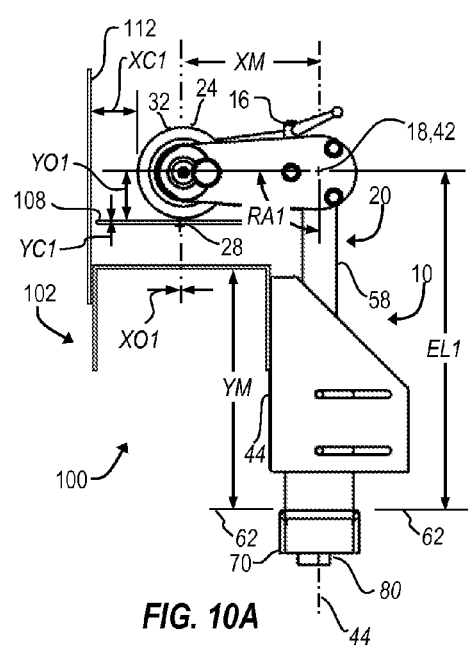
FIGS. 10A-10D are schematic end views of section 4-4 of the feed conveyor system of FIG. 3 including the adjusting device and illustrating a method of adjusting the position of an adjustable member of the system of FIG. 1 using the adjusting device.
Figure 10B:
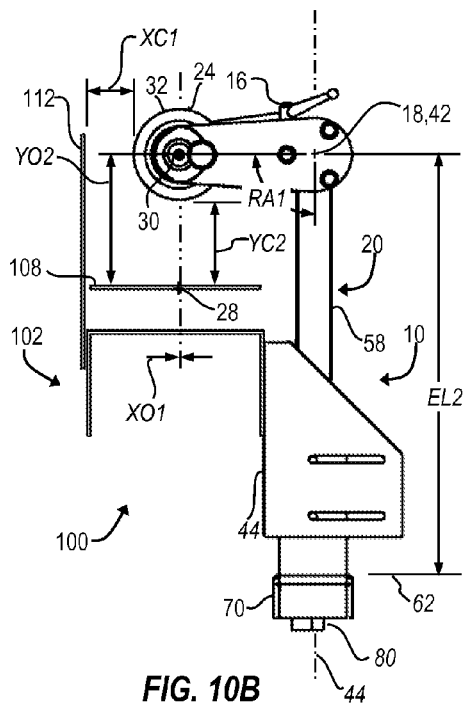

The timing screw assembly 26 includes a timing screw frame 14 to which a timing screw 24 is attachable, where the timing screw 24 may be one of a plurality of timing screws 24 of different sizes and shapes, each attachable to the timing screw frame 14. The timing screw 24 may also be referred to herein as a repositionable member 24 which is repositionable relative to one or more datums defined by the conveyor 102 to which the adjusting device 10 is mounted. The timing screw 24, also known as a feed screw, may be used to space objects 110 being fed through the timing screw 24 on the conveyor 102 and to establish a feed rate of the objects 110 being conveyed by the conveyor 102. The spacing interval between the objects 110 is defined by the configuration of the timing screw 24. For example, the timing screw 24 may define a generally helical shape (not shown) characterized by a pitch (not shown), where the pitch of the timing screw 24 determines the spacing interval for the objects 110 by conveying the objects 110 forward between the flights (teeth) of the helix. As shown in FIG. 10D, set-up and adjustment of the timing screw 24 may include positioning the timing screw 24 relative to a datum defined by the conveyor 102 to provide a vertical clearance YC between the timing screw 24 and the conveying surface 108 and a horizontal clearance XC between the timing screw 24 and the conveyor 102 guide rail 112 to receive and align an object 110 (shown in phantom in FIG. 10D) being progressed by the timing screw 24. For example, the timing screw 24 may be positioned such that the longitudinal axis 30 of the timing screw 24, also referred to herein as the axis 30 of the repositionable member 24 or as the timing screw axis 30, is aligned with or parallel to the longitudinal centerline of the conveyor belt 108, also referred to herein as the belt centerline 28, where the belt centerline 28 provides a primary datum for positioning the timing screw 24 relative to the conveyor 102. The position of the timing screw 24 may be adjusted in the x-y directions using the adjusting device 10, as described in further detail herein, to offset the timing screw axis 30 from the belt centerline 28 in the x-direction (horizontally as shown in the figures) by an x-offset distance XO to provide a horizontal clearance gap XC in the x-direction between the timing screw surface 32 and the guide rail 112 and/or to offset the axis of the timing screw 24 from the belt centerline 28 in the y-direction (vertically as shown in the figures) by a y-offset distance YO to provide a vertical clearance gap YC in the y-direction between the timing screw surface 32 and the conveying surface 108.

The timing screw 24 is mounted on the timing screw frame 14 as shown in FIGS. 1, 3 and 4, where the timing screw 24 is attachable to opposing attachment arms 34. The timing screw 24 may be attached to the timing screw frame 14 as shown in FIG. 1 to an idler assembly 36 at a first end of one of the attachment arms 34, and to a drive assembly 38 at a first end of the other of the attachment arms 34, such that the timing screw 24 can be rotated by the drive assembly 38 at a predetermined speed to progress objects 110 along the conveyor belt 106. The drive assembly 38 may be mounted to the attachment arm 34 and may include a motor 40 operatively connected to the drive assembly 38 to drive the drive assembly 38.

The timing screw frame 14 further includes a shaft 22 which is attached at either end to the second ends of the opposing attachment arms 34. The shaft 22, also referred to herein as a rotatable member 22, can be positioned in the clamping members 16 of the adjusting device 10 as described in further detail herein, such that with the clamping members 16 in an unlocked condition the rotatable member 22 is rotatable around the rotation axis 18 defined by the clamping members 16 to a rotation angle RA relative to the y-axis, where the longitudinal axis 42 of the rotatable member 22 is coincident with the rotation axis 18 defined by the clamping members 16 when the rotatable member 22 is positioned in the clamping members 16. As shown in FIGS. 4 and 10A-10B, the rotation angle RA may be defined, for example, as the angle between the extension axis 44 and a line extending through the rotation axis 18 and the timing screw axis 30. The rotatable member 22 can be retained at the rotation angle RA by locking the clamping members 16 to prevent movement of the rotatable member 22 relative to the clamping members 16.

Figures 5, 6:
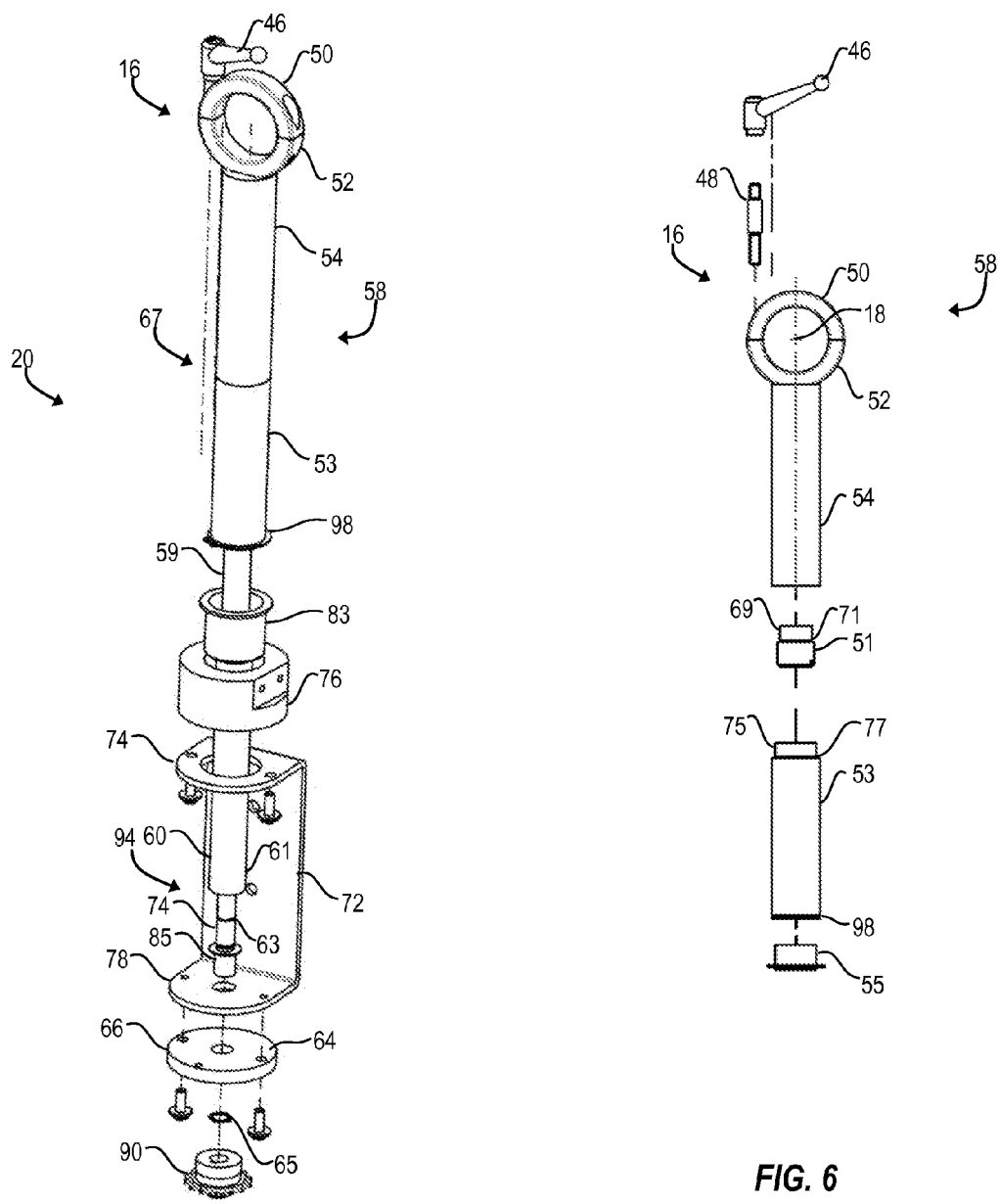
FIG. 5 is a schematic perspective exploded view of an extendable member of the adjusting device of FIG. 1.
FIG. 6 is an exploded schematic side view of an extendable portion of the extendable member of FIG. 5.

The clamping member 16 may be, by way of example and as shown in FIGS. 5 and 6, a two-piece split collar assembly which can be unlocked and/or opened to receive the rotatable member 22 by using a locking element 46, which may include a stud adapter 48, to adjust the studs (not shown) attaching the first collar element 50 to the second collar element 52. The clamping member may be fixedly attached to the extendable portion 58 by any suitable means, for example, by welding the second collar element 52 to the end of the extendable member 20, by attaching the second collar element 52 to the upper sleeve 54 of the extendable member 20 using a fastener such as a stud or rivet, etc.

As shown in FIGS. 1, 3 and 4, and in further detail in FIG. 2, the adjusting device 10 includes first and second extendable members 20 each defining an extension axis 44. Each of the extendable members 20 includes an extendable portion 58 which is operatively connected to an extension rod 60 such that the extendable portion 58 can be extended in the y-direction along the extension axis 44 to an extended length EL. The term "extended" as used herein, refers to movement of the extendable portion 58 relative to the extension rod 60 along the extension axis 44 in either a positive vertical direction (upward in the figures) such that the extended length is increasing or in a negative vertical direction (downward in the figures) such that the extended length is decreasing. The extended length EL may be measured from a horizontal reference 62 defined by the adjusting device 10, to the rotation axis 18 defined by the clamping members 16. The horizontal reference 62, in the example shown, may be a horizontal plane defined by the upper surfaces 64 (see FIG. 5) of the lower bearing blocks 66. The first and second extendable members 20 are connected by an alignment bracket 68 and a synchronizing mechanism generally indicated at 70 such that the extension axes 44 of the first and second extendable members 20 are parallel to each other and perpendicular to the horizontal reference 62. As shown in FIGS. 2 and 5, each extendable member 20 is supported axially by a support bracket 72, wherein the extendable portion 58 extends through an upper flange 74 of the support bracket 72 and an upper bearing block 76 attached to the upper flange 74, and the extension rod 60 extends through a lower flange 78 of the support bracket 72 and a lower bearing block 66 attached to the lower flange 78.

The synchronizing mechanism 70 is connected to the first and second extendable members 20 and is operable to simultaneously extend the extendable portions 58 of the first and second extendable members 20, such that the extended length EL of the first extendable member is equal to the extended length EL of the second extendable member, and such that the rotation axis 18 defined by the clamping members 16 is parallel to the horizontal reference 62 and perpendicular to the extension axes 44 of the first and second extendable members 20. The synchronizing mechanism 70 is actuable in the example shown by rotation of an actuator element 80 selectively attached to an adjustment interface 82 to concurrently change the extended length EL of the first and second extendable members 20.

The adjusting device 10 may further include mounting brackets 84 for attaching the adjusting device 10 to a mounting surface 114. In the example shown, each mounting bracket 84 is attachable to the adjusting device 10 via one or more attachment interfaces 12 defined by the support bracket 72. The mounting bracket 84 may be an adjustable bracket, to facilitate adjusting the location of the adjusting device 10 relative to the mounting surface 114 and/or conveyor belt centerline 28. Referring to FIGS. 3 and 4, the adjustable mounting bracket 84 may include a first adjustment feature 86, shown as a pair of vertical slots 86. Each vertical slot 86 may be configured to receive a fastener (not shown) for adjustably fastening the attachment bracket to the mounting surface 114. The location of the bracket relative to the mounting surface 114 may be adjusted by adjusting the position of the fastener in the vertical slot 86, to adjust the vertical position of the adjusting device 10 in the y-direction relative to the mounting surface 114 and/or the belt centerline 28, to a y-axis (vertical) mounting distance YM. The extendable members 20 may be adjusted to a predetermined extended length EL, for example adjusted to their minimum extended length $EL_{min}$, when adjusting the y-axis mounting distance such that in the example shown the y-axis mounting distance YM is the vertical distance between the belt centerline 28 and the horizontal reference 62. The mounting bracket 84 may further include a second adjustment feature 88, shown as a pair of horizontal slots 88, to adjust the horizontal position of the adjusting device 10 in the x-direction and relative to the mounting bracket 84 and to the mounting surface 114 and/or the belt centerline 28. The second adjustment feature 88 is configured to receive one or more fasteners (not shown) to attach the mounting bracket 84 to one or more attachment interfaces 12 defined by the support bracket 72. In the example shown, the x-direction (horizontal) mounting distance XM is the horizontal distance between the belt centerline 28 and the extension axis 44 of the extendable member 20. The adjustable features 86, 88 defined by the mounting brackets 84 increase the range of locations to which the repositionable member 24, e.g., the timing screw 24, may be adjusted using the adjusting device 10, by allowing repositioning of the adjusting device 10 relative to the primary datum, e.g., relative to the belt centerline 28 in the example shown.

Referring to FIGS. 4 and 10A-10B, the adjusting device 10 may be used to adjust the location of a repositionable member 24, which is the timing screw 24 in the example shown, both vertically in the y-axis direction and horizontally in the x-axis direction, relative to a single point defined by the rotation axis 18, and relative to a datum defined, in the example shown, by the belt centerline 28 of a conveyor 102 to which the adjusting device 10 is mounted. A method of adjusting the location of the repositionable member 24 is illustrated in a non-limiting example shown in FIGS. 10A-10D, wherein the repositionable member 24 is a timing screw 24 operatively attached to a timing screw frame 14 including a shaft 22 defining a rotatable member 22. The method includes mounting the adjusting device 10 to a mounting surface 114 defined by the conveyor 102 using one or more adjustable mounting brackets 84.

The method may include adjusting the location of the adjusting device 10 using the one or more of the adjustable features 86, 88 of the mounting brackets 84 to level or align the adjusting device 10 relative to the mounting surface 114 such that the rotation axis 18 is parallel to the belt centerline 28, for example, and/or to reposition the adjusting device 10 relative to the belt centerline 28 using the first and second attachment features 86, 88 defined by the mounting bracket 84, as described previously herein, to establish mounting distances YM and XM. The rotatable member 22, which in the example shown is the shaft 22 of the timing screw frame 14, may be located in the clamping members 16 of the adjusting device 10 either before or after adjusting the adjustable brackets 68, 72, 84 relative to the mounting surface 114. In the example shown in FIG. 4, the initial location of the adjusting device 10 may be adjusted with the extendable members 20 extended to the minimum extended length $EL_{min}$, and such that the timing screw frame 14 is rotated in the clamping members 16 to define a degree rotation angle RA to the extension axes 44 when the surface of the timing screw 24 is positioned on the conveyor belt 106 without any vertical clearance YC between the outer surface of the timing screw 24 and the conveying surface 108. In this initial position, the rotation axis 18 and the timing screw axis 30 together define a plane which is horizontal to the conveying surface 108 and the device horizontal reference 62, and the timing screw axis 30 is vertically offset from the belt centerline 28 (the primary datum) by a y-offset distance YO.

Referring now to FIGS. 10A-10D, FIG. 10A shows the adjusting device 10 mounted to the mounting surface 114 of the conveyor 102. In preparation for adjustment of the timing screw 24 to a predetermined position relative to the belt centerline 28 of the conveyor belt 106 by the adjusting device 10, the rotatable member 22 of the timing screw assembly 26 is retained in the clamping members 16 with the clamping members 16 in a locked condition such that the rotatable member 22 of the timing screw assembly 26 is not rotatable around the rotation axis 18, and the rotation angle is fixed at an initial rotation angle RA1. The extendable members 20 in this initial position are set at an extended length EL1. In one example, the timing screw 24 may be positioned with the initial rotation angle RA1 at degrees and with the initial extended length EL1 set to the minimum extended length of $EL_{min}$ as shown in FIG. 4. In the example shown in FIG. 10A, the timing screw 24 is positioned relative to the centerline 28 of the conveyor belt 106 such that the timing screw axis 30 is offset vertically (in the y-direction) an initial offset distance YO1 from the belt centerline 28, and the timing screw axis 30 is initially aligned with the belt centerline 28 such that the horizontal (x-direction) offset distance XO1 is zero. In the position shown in FIG. 10A, a horizontal (x-direction) clearance XC1 is initially defined between the surface of the timing screw 24 and the sidewall or guide rail 112 of the conveyor 102, and a vertical (y-direction) clearance YC1 is initially defined between the surface of the timing screw 24 and the conveyor 102 as zero, corresponding with the surface of the timing screw 24 in contact with the conveying surface 108.

In a next step shown in FIG. 10B, the synchronizing mechanism 70 is actuated to concurrently and simultaneously extend the first and second extendable members 20 from the initial extended length EL1 to an extended length EL2. The clamping members 16 are maintained in a locked condition during the step shown in FIG. 10B, thereby retaining the timing screw assembly 26 at the initial rotation angle RA1. The synchronizing mechanism 70 may be actuated, for example, by an actuator element 80 configured to interface with an adjustment interface 82 defined by a driven end 94 (see FIG. 5) of the extension rod 60 of one of the first and second extendable members 20.

Figure 7:
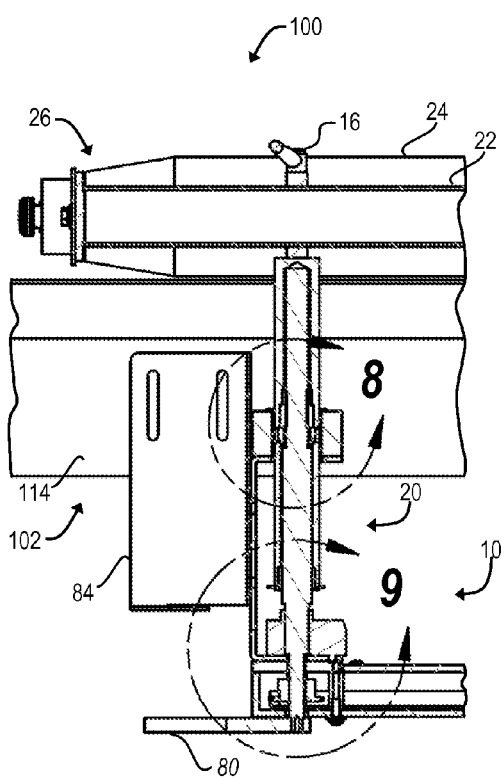
FIG. 7 is a partial view of section 7-7 of the adjusting device of FIG. 4 including a cross-sectional view of the adjusting device including the extendable member.
Figure 9:
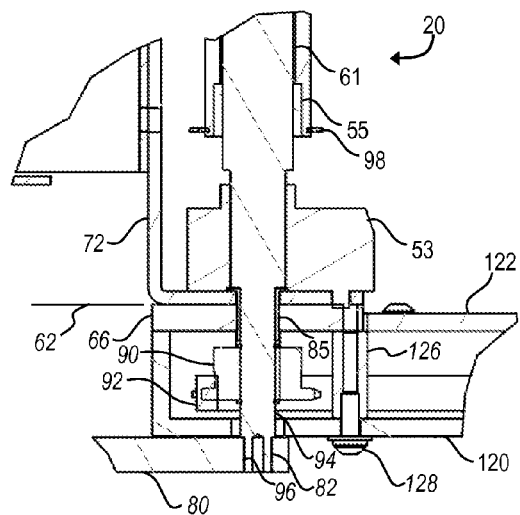
FIG. 9 is a fragmentary cross-sectional view of section 9 of the adjusting device of FIG. 7 including the extendable member.

As shown in FIGS. 2, 7 and 9, by way of non-limiting example, each extendable member 20 includes an extendable portion 58 which is rotatably attached to the extension rod 60 such that the extendable portion 58 is adjustable to an extended length EL by rotation of the extension rod 60 relative to the extendable portion 58. In one example, the extension rod 60 may include a threaded portion 59 and the extendable portion 58 may include a threaded element 51 where the extendable portion 58 is rotatably attached to the extension rod 60 via the threaded portion 59 and the threaded element 51. The threaded portion 59 and threaded element 51 may each define an Acme thread profile and may be rotatably attached to comprise an Acme screw.

The extension rod 60 of each of the extendable members 20 may include a sprocket 90 attached to the driven end 94 of the extension rod 60 such that the extension rod 60 is rotatable by rotation of the sprocket 90. As shown in FIGS. 2, 7 and 9, the synchronizing mechanism 70 may include a chain element 92 operatively attaching the sprocket elements 90 of the first and second extension rods 60, such that rotation of one of the sprocket elements 90 by the chain 92 simultaneously rotates the other sprocket element 90 to concurrently rotate the extension rods 60 of the first and second extendable members 20 and to concurrently adjust the extended length EL of the first and second extendable members 20 by rotation of the extendable portion 58 relative to the extension rod 60, and such that the extended length EL of the first extendable member 20 and the extended length EL of the second extendable member 20 are the same and remain the same as the extended length EL is adjusted from a first extended length EL1 to a second extended length EL2, from the second extended length EL2 to a third extended length EL3, and so on, by actuation of the synchronizing mechanism 70.

As shown in FIGS. 2, 7 and 9, the driven end 94 of at least one of the extension rods 60 defines an adjustment interface 82 to receive an actuator element 80, where the actuator element 80 can be used to actuate the synchronizing mechanism 70 by rotating the extension rod 60 via the adjustment interface 82. In a non-limiting example shown in FIGS. 2, 7 and 9 the actuator element 80 may be a crank or ratchet wrench having an interface portion 96 (see FIG. 9) selectively attachable to the adjustment interface 82 to rotate the extension rod 60 and sprocket 90. The adjustment interface 82 of the extension rod 60 is configured to interface with the interface portion 96 of the actuator element 80. For example, the interface portion 96 of the actuator element 80 may be a ratchet-type socket for a square head drive, and the adjustment interface 82, 82 may define a square head drive end rotatable by the ratchet-type socket. Other corresponding interface portions 96 and adjustment interfaces 82 may be used, for example, hex head configurations, etc.

Figure 10C:
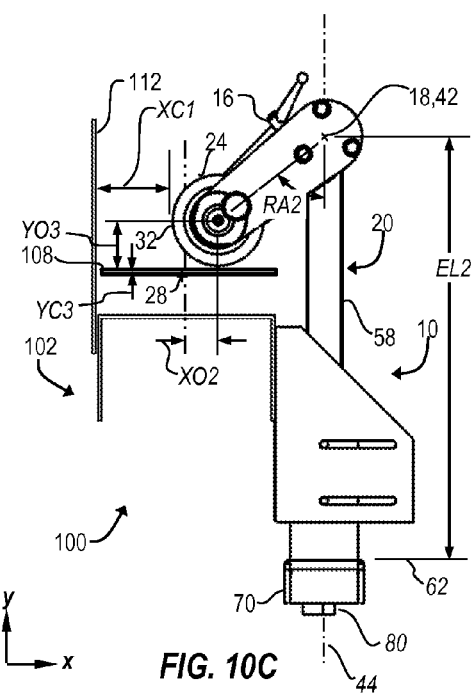
Figure 10D:
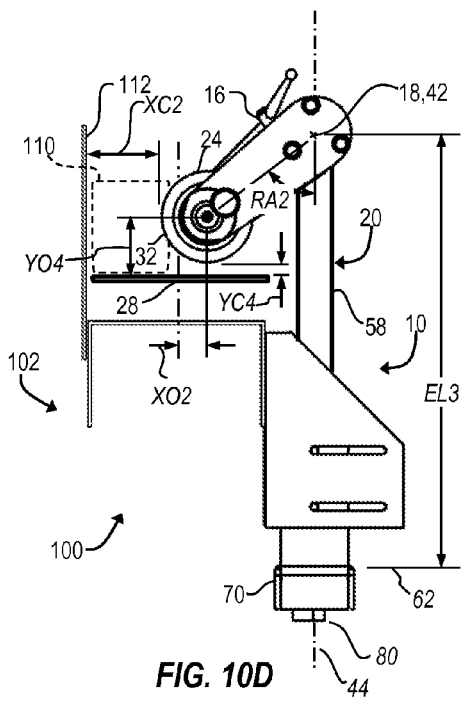

Referring again to the step shown in FIG. 10B, the first and second extendable members 20 are extended to an extended length EL2, which may be a predetermined extended length EL to provide a horizontal clearance XC2 as shown in FIG. 10C after rotating the timing screw assembly 26 to a second rotation angle RA2. The extended length EL2 may be predetermined such that the timing screw 24, when rotated in the next step shown in FIG. 10C to the second rotation angle RA2, rests on the conveying surface 108 to maintain the second rotation angle RA2 while relocking the clamping members 16. The adjusting device 10 may include a sensing element 116 (see FIGS. 2 and 3) configured to provide an output corresponding to the extended length EL of the extendable members 20. By way of non-limiting example, the sensing element 116 may be a counter 116 operatively mounted on one of the extension rods 60 to sense rotations of the extension rod 60 and to provide an output which may be a counter 116 value, where the counter 116 value can be correlated to the extended length EL. The counter 116 may be a mechanical counter 116 including a visual display 118 to display the counter 116 value. Other configurations of the sensing element 116 are possible. For example, the sensing element 116 may be arranged to sense the position of the extendable portion 58, for example, by sensing movement or the position of a feature of the extendable portion 58 such as a travel stop 98 (see FIG. 3) in the x-direction. In another example (not shown), the sensing element 116 may be an electronic element for sensing rotation of the extension rod 60 and/or the position in the x-direction of a feature of the extendable portion 58, and the output may be an output signal generated by the electronic sensing element 116 which can be correlated to the extended length EL. The electronic output signal may be output to a controller (not shown) and/or an electronic display (not shown). The example of a manually manipulated actuator element 80 configured as a removable wrench is non-limiting. For example, the actuator element 80 may be attached to the adjustment interface 82 and may be electrically actuated in response to the output signal from the sensing device to provide a rotation input to one of the extension rods 60, to drive the chain 92 of the synchronizing mechanism 70, or to otherwise actuate the synchronizing mechanism 70 in response to the electronic output signal.

Referring now to FIG. 10C, in a next step the locking elements 46 of the clamping members 16 are unlocked to allow rotation of the rotatable member 22 around the rotation axis 18 to a second rotation angle RA2. As described previously, the second extended length EL2 may be predetermined such that the timing screw 24 rests on the conveying surface 108 when rotated to the second rotation angle RA2, and such that the vertical clearance VC3 is zero and the timing screw assembly 26 is supported by the conveying surface 108 at this position, to allow locking of the clamping members 16 to retain the timing screw assembly 26 at this orientation without having to otherwise support the timing screw assembly 26 at the second rotation angle RA2. The locking elements 46 are locked after the rotatable member 22, including the timing screw 24 attached to the rotatable member 22, has been rotated to the second rotation angle RA2. In this position, the timing screw axis 30 is vertically offset from the belt centerline 28 by a vertical offset distance YO3, and horizontally offset from the belt centerline 28 by a horizontal offset distance XO3. The horizontal offset distance XO3 defines a horizontal clearance XC2 between the timing screw surface 32 and the conveyor 102 guide rail 112 for receiving objects 110 being conveyed via the conveyor 102 in the timing screw 24, where the horizontal clearance XC2 corresponds to the size and/or configuration of the objects 110 being conveyed.

The horizontal clearance XC2 may provide, for example, sufficient clearance to retain the object 110 between the flights (not shown) of the timing screw 24 such that the timing screw 24 can progress the object 110 along the conveyor 102 without the object 110 hanging up on the guide rail 112 and/or conveyor surface 108.

In a next step shown in FIG. 10D, the synchronizing mechanism 70 is actuated to extend the extendable members 20 from the extended length EL2 to an extended length EL3, increasing the vertical offset distance from YO3 to a vertical offset distance YO4 to define a vertical clearance YC4 between the timing screw surface 32 and the conveying surface 108. The clearance YC4 may define a minimum clearance gap between the timing screw 24 and the conveyor belt 106 to prevent interference and/or contact between the timing screw 24 and the conveying surface 108 in operation of the conveying system. The clearance YC4 may correspond to a predetermined vertical offset distance YO4 to position the timing screw 24 relative to the belt centerline 28 such that the surface of the timing screw 24 contacts an object 110 (shown in phantom in FIG. 10D) being received by the timing screw 24 along a contact line defined by a horizontal plane including the timing screw axis 30.

The method may continue, for example, with readjusting the position of the timing screw 24 to accommodate, e.g., to receive and interval space another subsequent object 110 type having a different size and/or configuration than the object 110 type having a size and configuration corresponding to the position of the timing screw 24 defined by the x-offset distance XO2 and the y-offset distance YO4 shown in FIG. 10D. The method may include adjusting the timing screw 24 to another, subsequent, position (not shown) corresponding to subsequent x- and y-offset distances XOm and YOn (not shown), to position the timing screw 24 to receive and space the subsequent object 110 type.

Readjusting the position of the timing screw 24 to a subsequent position may also include adjusting the position of the adjusting device 10 relative to the mounting surface 114 using the adjustment features 86, 88 defined by the mounting brackets 84, to change the range of adjustment which can be effected by the adjusting device 10 relative to the conveyor 102 reference points including the belt centerline 28. For example, the adjustment range of the adjusting device 10 may be adjusted in the x-direction relative to the mounting surface 114 by changing the horizontal mounting distance XII (see FIG. 4), to increase the available range of positions to which the timing screw 24 may be adjusted relative to the belt centerline 28. For example, the horizontal mounting distance XII may be decreased to relocate the adjusting device 10 inboard toward the mounting surface 114 to allow positioning of the timing screw 24 closer to the guide rail 112 to accommodate receiving relatively smaller objects 110 being fed through the conveyor 102, including, for example, objects 110 having a width less than a third of the width of the conveyor belt 106. The horizontal mounting distance XM may be increased by relocating the adjusting device 10 outboard and away from the mounting surface 114 to allow positioning of the timing screw 24 further from the guide rail 112 to accommodate receiving relatively larger objects 110 being fed through the conveyor 102, including, for example, objects 110 having a width greater than half the width of the conveyor belt 106.

The method may continue, for example, with removing the timing screw 24 from the timing screw frame 14 and replacing the removed timing screw 24 with a different timing screw 24. The removed timing screw 24 may be different in size and/or configuration than the replacement timing screw 24 to accommodate feeding objects 110 through the conveyor 102 and timing screw 24 at a different rate or spacing interval corresponding to the replacement timing screw 24 and different than the feed rate or spacing interval accommodated by the removed feed screw. For example, the removed timing screw 24 may have a different helical profile than the replacement timing screw 24, differing in one or more of pitch, major diameter, minor diameter, etc. The adjusting device 10 may be used as previously described herein to adjust the position of the replacement timing screw 24 relative to the belt centerline 28 of the conveyor belt 106, a guide rail 112, or other feature of the feed conveyor system 100. Changing the timing screw 24 to a replacement timing screw 24 may also include adjusting the position of the adjusting device 10 relative to the mounting surface 114 using the adjustment features 86, 88 defined by the mounting brackets 84, to change the range of adjustment which can be effected by the adjusting device 10 relative to the conveyor 102 reference points including the belt centerline 28. It would be understood that a plurality of timing screws 24 of differing sizes and shapes may be attachable to the timing screw frame 14 and repositionable by the adjusting device 10.

The example of a repositionable element configured as a timing screw 24 is not intended to be limiting, and it would be understood that the adjusting device 10 may be used to adjust the position of any repositionable element comprising a rotatable member 22 and/or attachable to a rotatable member 22 receivable by the adjusting device 10. For example, the rotatable member 22 may define a holder such as a tool holder or fixture holder, wherein the adjusting device 10 may receive the rotatable member 22 of the holder and be used to adjust the position of a tool, fixture or other element retained by the holder in the x-direction and y-direction relative to the z-direction of the rotation axis 18 of the rotatable member 22, using the method described herein.

Referring to FIGS. 2 and 5-9, an example configuration of the extendable member 20 is shown in additional detail. The extendable member 20 includes an extension rod 60, and an extendable portion 58 which is rotatably attached to the extension rod 60 such that the extendable portion 58 is adjustable to an extended length EL by rotation of the extension rod 60 relative to the extendable portion 58. The extendable portion 58, as shown in FIGS. 6-9, includes a clamping member, an upper sleeve 54, a threaded element 51, a lower sleeve 53 and a guide bushing 55.

The clamping member may be a two-piece split collar assembly which can be unlocked and/or opened to receive the rotatable member 22 by using a locking element 46, which as shown may include a stud adapter 48, to adjust the studs (not shown) attaching the first and second collar elements 50, 52, of the split collar assembly. The clamping member may be fixedly attached to the upper end (as shown in the drawings) of the upper sleeve 54 of the extendable portion 58 by any suitable means, for example, by welding the second collar element 52 to the end of the extendable member 20, by attaching the second collar element 52 to the upper sleeve 54 of the extendable member 20 using a fastener such as a stud or rivet, etc. The first collar element 50 can be unlocked and loosened, removed, or partially displaced from the second collar element 52, to receive the rotatable member 22. The clamping member may be made from a metal based material. In one example, the clamping member is made of a stainless steel material, which may be of a grade or alloy suitable for use in food processing, pharmaceutical and/or medical industries.

The extendable portion 58 defines an internal rod cylinder 57 to receive a threaded portion 59 and intermediate portion 61 of the extension rod 60, and is rotatably attached to the extension rod 60 via the threaded element 51 which is configured to rotatably mesh with the threaded portion 59 of the extension rod 60. The threaded portion 59 and threaded element 51 may each define an Acme thread profile (not shown). The extension rod 60 includes a retainer groove 63 and is fixed in the x-direction relative to a lower bearing block 66, by way of example, by a retaining element 65 operatively inserted in the retainer groove 63. The retaining element 65 may be a retainer ring or circlip 65. The extendable portion 58 extends through an upper bearing block 76 and is moveable in the x-direction, e.g., along the extension axis 44 of the extendable member 20, such that the extendable portion 58 is rotatable relative to the extension rod 60 and movable in the X-direction by rotation of the extension rod 60 around the extension axis 44 to comprise an Acme screw.

Figure 8:
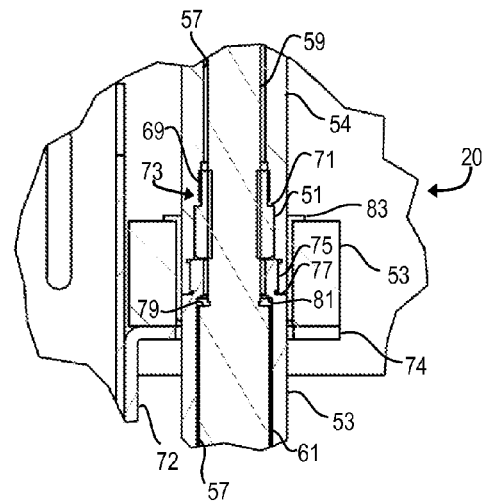
FIG. 8 is a fragmentary cross-sectional view of section 8 of the adjusting device of FIG. 7 including the extendable member.

The threaded element 51 may be a screw bushing 51 which is internally threaded to define a threaded interface having a thread profile which rotatably meshes with the thread profile defined by a threaded portion 59 (see FIG. 7) of the extension rod 60. The threaded element 51 is positioned inside the lower end of the upper sleeve 54 intermediate the upper sleeve 54 and the lower sleeve 53, and the upper sleeve 54 is attached to the lower sleeve 53 to define a sleeve portion 67. As shown in FIG. 8, the threaded element 51 may be a screw bushing 51 which is retained in a stepped portion 73 of the upper sleeve 54. The screw bushing 51 may include a bushing neck 69 and a bushing shoulder 71 and may be fitted into a stepped portion 73 of the upper sleeve 54. The lower sleeve 53 may include a sleeve neck 75 and a sleeve shoulder 77. The sleeve neck 75 of the lower sleeve 53 is inserted as shown in FIG. 8 into the lower end of the upper sleeve 54 and attached to the upper sleeve 54 to retain the screw bushing 51 in position intermediate the upper and lower sleeves 54, 53. The lower sleeve 53 may be attached to the upper sleeve 54, for example, by a press fitting the sleeve neck 75 of the lower sleeve 53 to the stepped portion 73 of the upper sleeve 54, or may be joined by other means such as welding, soldering, etc., suitable to attach the upper and lower sleeves 54, 53. The screw bushing 51 may be retained in position in the stepped portion 73 of the upper sleeve 54, for example, by press fitting the bushing neck 69 to the stepped portion 73 of the upper sleeve 54 as shown in FIG. 8, and by interference of the bushing shoulder 71 with the stepped portion 73 of the upper sleeve 54. The lower sleeve 53 neck may be configured such that the top surface of the sleeve neck 75 is in contact with the lower surface of the screw bushing 51 and supports the screw bushing 51 in the retained position.

A guide bushing 55 may be inserted in the lower end of the lower sleeve 53 to align the intermediate portion 61 of the extension rod 60 relative to the portion of the rod cylinder 57 defined by the lower sleeve 53. The lower end of the lower sleeve 53 may be configured to define a travel stop 98 to limit extension of the extendable member 20 to a maximum extended length EL. In the example shown, a retainer ring is attached to the lower end of the lower sleeve 53 to define the travel stop 98. As the extendable member 20 is extended in an upward direction (as oriented in the figures) the travel stop 98 will interfere with the upper flange 74 of the support bracket 72, thus preventing further upward extension of the extendable portion 58 and unthreading of the extendable portion 58 from the upper end (as oriented in the figures) of the threaded portion 59 of the extension rod 60. The maximum extension and maximum extended length EL of the extendable member 20 is determined, in the example shown, by interference of the travel stop 98 with the upper flange 74 of the support bracket 72. The example shown here is non-limiting, and other configurations defining a maximum travel stop 98 or maximum extension limiter may be used.

As shown in FIG. 8, a rod shoulder 79 may be defined between the threaded portion 59 of the extension rod 60 and the intermediate portion 61 of the extension rod 60. The sleeve neck 75 of the lower sleeve 53 may include an internal step 81 configured to interfere with the rod shoulder 79, to limit the downward rotation of the extendable portion 58 relative to the extension rod 60, and to establish a minimum extended length $EL_{min}$ (see FIG. 4), in the example shown, by interference of the internal step 81 with the rod shoulder 79 during downward rotation of the extendable portion 58 relative to the extension rod 60. The internal step 81 and rod shoulder 79 may be positioned axially such that a clearance gap is maintained between the top end of the threaded portion 59 of the extension rod 60 and the terminating end of the rod cylinder 57 when the extendable portion 58 is extended to the minimum extended length $EL_{min}$. The example shown here is non-limiting, and other configurations to define or control the minimum extended length $EL_{min}$ may be used.

The extension rod 60 of each of the extendable members 20 may include a sprocket 90 such that the extension rod 60 is rotatable by rotation of the sprocket 90. The sprocket 90 is attached, as shown in FIGS. 5 and 9, to the driven end 94 of the extension rod 60 and retained in position by a flanged lower bushing 85 and the retaining element 65. As shown in FIGS. 2, 7 and 9, the synchronizing mechanism 70 may include a chain element 92 operatively attaching the sprocket elements 90 of the first and second extension rods 60, such that rotation of one of the sprocket elements 90 by the chain 92 simultaneously rotates the other sprocket element 90 to concurrently rotate the extension rods 60 of the first and second extendable members 20 and to concurrently adjust the extended length EL of the first and second extendable members 20 by rotation of the extendable portion 58 relative to the extension rod 60, such that the extended length EL of the first extendable member 20 and the extended length EL of the second extendable member 20 are the same and remain the same as the extended length EL is adjusted from a first extended length EL1 to a second extended length EL2, from the second extended length EL2 to a third extended length EL3, and so on, by actuation of the synchronizing mechanism 70.

The synchronizing mechanism 70 including the chain element 92 and sprockets 90 may be housed in a mechanism housing 120 including a removable housing cover 122. The mechanism housing 120 protects the sprockets 90 and chain element 92 from exposure to contaminants and contains the synchronizing mechanism 70. The removable housing cover 122 may be removed to service the synchronizing mechanism 70, for example to adjust the chain 92 tension and/or to replace the chain 92 or sprocket elements 90, etc. The housing cover 122 may be made of a clear material, such as LEXAN®, so that the synchronizing mechanism 70 is visible through the cover. The driven end 94 of the extension rod 60 defining the drive interface 82 may extend through a rod opening 124 defined by the mechanism housing 120, such that the drive interface 82 is accessible by the actuator element 80 while containing the sprockets 90 and chain element 92.

The housing is attachable to the lower bearing blocks 66 of the first and second extendable member 20 via an alignment post 126 and fastener 128 operatively attaching the housing to the lower bearing blocks 66 and support brackets 72 of the first and second extendable members 20, as shown in detail in FIG. 9.

As shown in FIGS. 2, 7 and 9, at least one of the extension rods 60 defines an adjustment interface 82, also referred to as a drive interface 82, to receive an actuator element 80, where the actuator element 80 can be used to actuate the synchronizing mechanism 70 by attaching the actuator element 80 to the adjustment interface 82, and rotating the driven end 94 of the extension rod 60 using the actuator element 80. In another configuration (not shown), both of the extension rods 60 may define an adjustment interface 82 and the housing may include two rod openings 124 such that the driven ends 94 of the extension rods 60 of both the first and the second extendable members 20 extend through the housing and are actuable by the actuator element 80, such that the adjusting mechanism can be actuating via each of the driven ends 94, which may be beneficial, for example, where access to one or the other of the driven ends 94 is limited, for example, due to the mounted location of the adjusting device 10.

In a non-limiting example shown in FIGS. 2, 7 and 9 the actuator element 80 may be a crank or ratchet wrench having an interface portion 96 selectively attachable to the adjustment interface 82 to rotate the extension rod 60 and sprocket 90. The adjustment interface 82 of the extension rod 60 is configured to interface with the interface portion 96 of the actuator element 80. For example, the interface portion 96 of the actuator element 80 may be a ratchet-type socket for a square head drive, wherein the adjustment interface 82 defines a square head drive interface 82. Other corresponding interface portions 96 and adjustment interfaces 82 may be used, for example, hex head configurations, etc.

Each extendable member 20 includes a support bracket 72, which as described previously may include at least one attachment interface 12 for attaching a mounting bracket 84. As shown in FIGS. 5 and 7-9, the support bracket 72 includes an upper flange 74 and lower flange 78. An upper bearing block 76 including a flanged upper bushing 83 is attached to the upper flange 74 of the support bracket 72. As shown in detail in FIG. 8, the extendable portion 58 extends through openings defined by the upper flange 74 and the flanged upper bushing 83 of the upper bearing block 76, such that the extendable portion 58 is axially supported during extension of the extendable portion 58 relative to the extension rod 60 by the upper flange 74 and the upper bearing block 76.

A lower bearing block 66 including a flanged lower bushing 85 is attached to the lower flange 78 of the support bracket 72. As shown in detail in FIG. 9, the driven end 94 of the extension rod 60 extends through openings defined by the lower flange 78 and the lower flanged bushing of the lower bearing block 66, such that the extension rod 60 is axially supported by the lower flange 78 and the lower bearing block 66.

The upper bearing blocks 76 of the first and second extendable members 20 are connected by an alignment bracket 68 attachable to each of the upper bearing blocks 76 as shown in FIG. 3. The lower bearing blocks 66 of the first and second extendable members 20 are connected by the mechanism housing 120 as shown in FIGS. 3 and 9. The first and second extendable members 20 are connected by the alignment bracket 68 and the mechanism housing 120 such that the extension axes 44 of the first and second extendable members 20 are parallel to each other and perpendicular to the horizontal reference 62 defined by the plane including the upper surfaces 64 of the lower bearing blocks 66 of the first and second extendable members 20.

In a non-limiting example, the objects 110 fed via the feed conveyor system 100 may be containers such as bottles, cans, cups, etc., subject to container filling, sealing, bundling and packaging operations. The feed conveyor system 100 may be used in a work environment which may require maintaining a predetermined level of sanitary conditions for processing of the objects 110 being conveyed, for example, in the processing of containers for food stuffs or pharmaceuticals, or the conveyance of other objects 110 requiring a predetermined level of sanitary conditions. Therefore, the materials from which the various components of the feed conveyor system 100, timing screw assembly 26 and adjusting device 10 are made would be selected from those types of materials approved for use in hygienic conditions which would include materials which may be non-corrosive, scratch resistant, sterilizable or otherwise readily cleanable, anti-bacterial, non-toxic, etc. For example, metallic elements of the feed conveyor system 100 which may include the conveyor housing 104, the conveyor belt 106, the timing screw frame 14 shaft 22 and attachment arms 34, the clamping members 16, extension rods 60, first and second sleeve portions 67 of the extendable members 20, etc., may be made of stainless steel. For example, elements of the feed conveyor system 100 which may be made of non-metallic materials, such as polymer based materials, which may include the housing and housing cover 122 of the synchronizing mechanism 70, the drive assembly 38 housing, the timing screw 24, etc., may be made of high strength polymers which have low moisture absorption and are readily cleanable, scratch and abrasion resistant, non-toxic, and resistive to corrosive chemical attack including resistive to corrosive attack by cleaning agents, such as thermoplastic polyethylene materials including ultra-high-molecular-weight polyethylene (UHMWPE, UHMW) also know as high-modulus polyethylene (HMPE) or high-performance polyethylene (HPPE), and/or polycarbonate resin thermoplastics including Lexan®.

The examples provided herein are non-limiting, and other configurations and embodiments existing for practicing the invention described herein. For example, the rotatable member 22 can be configured other than as a simple shaft 22, e.g., the rotatable member 22 may include journaled portions (not shown) for interfacing with the clamping members 16. By way of example, the adjusting device 10 can be mounted to a non-vertical surface, which may be a horizontal surface such that the extendable portions 58 are extendable in the horizontal, e.g., x-axis direction while rotation of the rotatable member 22 adjusts the position of the repositionable member 24 in the x-axis and y-axis direction.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An adjusting device for adjusting the position of a rotatable member, the adjusting device comprising:
    first and second extendable members;
    wherein each of the first and second extendable members defines an extension axis and includes:
        an extendable portion adjustable along the extension axis to an extended length;
        a clamping member attached to the extendable portion and configured to receive a rotatable member;
        wherein the clamping member is lockable to prevent rotation of the rotatable member relative to the clamping member;
    wherein the clamping members:
        define a rotation axis perpendicular to the extension axes of the first and second extendable members; and
        are arranged such that with the clamping members unlocked the rotatable member received in the clamping members is rotatable about the rotation axis; and a synchronizing mechanism connected to the first and second extendable members and operable to simultaneously adjust an extended length of the first and second extendable portions such that the extended length of the first extendable portion and the extended length of the second extendable portion are substantially equal.

2. The adjusting device of claim 1, wherein:
the extendable member includes an extension rod; and
the extendable portion is moveably attached to the extension rod such that the extendable portion is adjustable to the extended length by movement of the extendable portion along the extension axis and relative to the extension rod.

3. The adjusting device of claim 2, wherein the extendable portion is rotatably attached to the extension rod such that the extendable portion is adjustable to the extended length by rotation of the extension rod relative to the extendable portion.

4. The adjusting device of claim 3, wherein:
the extension rod includes a threaded portion;
the extendable portion includes a threaded element; and
the threaded element is rotatably attached to the threaded portion.

5. The adjusting device of claim 4, wherein the threaded portion and threaded element comprise an Acme screw.

6. The adjusting device of claim 3, wherein:
the synchronizing mechanism is operable to simultaneously rotate the extension rods of the first and second extendable members.

7. The adjusting device of claim 6, wherein:
each of the extension rods includes a sprocket; and
the synchronizing mechanism includes a chain operatively attached to each of the sprockets to simultaneously rotate the extension rods of the first and second extendable members.

8. The adjusting device of claim 1, wherein the clamping member includes a split collar assembly.

9. The adjusting device of claim 1, wherein the first and second extendable members are operatively attached such that the extension axes of the first and second extendable members are parallel.

10. The adjusting device of claim 1, further comprising:
a mounting bracket operatively attached to the adjusting device;
the mounting bracket including a first adjustable attachment feature for attachment of the mounting bracket to a mounting surface;
wherein the position of the adjusting device relative to the mounting surface is adjustable by adjustment of the first adjustable attachment feature.

11. The adjusting device of claim 10, further comprising:
the mounting bracket including a second adjustable attachment feature for attachment of the mounting bracket to the adjusting device;
wherein the position of the adjusting device relative to the mounting surface is adjustable by adjustment of the second adjustable attachment feature.

12. The adjusting device of claim 11, wherein the position of the adjusting device relative to the mounting surface is adjustable in a first direction by adjustment of the first adjustable attachment feature and adjustable in a second direction perpendicular to the first direction by adjustment of the second adjustable attachment feature.

13. The adjusting device of claim 1, wherein:
the rotatable member includes at least one attachment element having a first end and a second end;
the first end operatively attached to the rotatable member; and
the second end configured to receive a repositionable member such that the repositionable member is repositionable by at least one of rotation of the rotatable member and adjustment of the extended length of the first and second extendable members.

14. A method for adjusting the position of a rotatable member, the method comprising:
receiving the rotatable member in an adjusting device;
wherein the adjusting device includes:
first and second extendable members;
wherein each of the first and second extendable members defines an extension axis and includes:
a first extendable portion adjustable along the extension axis to an extended length;
a clamping member attached to the extendable portion and configured to receive the rotatable member;
wherein the clamping member is lockable to prevent rotation of the rotatable member relative to the clamping member;
wherein the clamping members:
define a rotation axis perpendicular to the extension axes of the first and second extendable members; and
are arranged such that with the clamping members unlocked the rotatable member received in the clamping members is rotatable about the rotation axis; and
a synchronizing mechanism connected to the first and second extendable members and operable to simultaneously adjust an extended length of the first and second extendable portions such that the extended length of the first extendable portion and the extended length of the second extendable portion are equal;
locking the clamping members of the first and second extendable portions to retain the rotatable member in a first position corresponding to a first extended length and a first rotation angle;
adjusting the extended length of the first and second extendable portions to a second extended length using the synchronizing mechanism;
unlocking the clamping members of the first and second extendable portions;
rotating the rotatable member to a second rotation angle;
locking the clamping members to retain the rotatable member in a second position corresponding to the second extended length and the second rotation angle.

15. The method of claim 14, further comprising:
unlocking the clamping members of the first and second extendable portions;
rotating the rotatable member to a third rotation angle; and
locking the clamping members to retain the rotatable member in a third position corresponding to the third rotation angle.

16. The method of claim 14, further comprising:
adjusting the extended length of the first and second extendable portions to a third extended length using the synchronizing mechanism such that the rotatable member is retained in a third position corresponding to the third extended length.

17. The method of claim 14, wherein the adjusting device includes a mounting bracket, the method further comprising:
attaching the adjusting device to a mounting surface using the mounting bracket;

adjusting the position of the adjusting device relative to the mounting surface using an adjustment feature defined by the mounting bracket.

18. The method of claim 14, wherein:
the rotatable member includes first and second attachment arms operatively attached to the rotatable member at a first arm end;
a second arm end of each of the first and second attachment arms configured to receive a repositionable member;
the method further comprising:
attaching the repositionable member to the second arm ends of the first and second attachment arms; and
adjusting at least one of the extended length of the first and second extendable members and the rotation angle of the rotatable element to reposition the repositionable member to a predetermined position.

19. An adjusting device for adjusting the position of a rotatable member, the adjusting device comprising:
first and second extendable members;
wherein each of the first and second extendable member defines an extension axis and includes:
a first extendable portion adjustable along the extension axis to an extended length;
an extension rod;
wherein the extendable portion is rotatably attached to the extension rod;
a clamping member attached to the extendable portion and configured to receive a rotatable member;
wherein the clamping member is lockable to prevent rotation of the rotatable member relative to the clamping member;
wherein the first and second clamping members:
define a rotation axis perpendicular to the extension axes of the first and second extendable members; and
are arranged such that with the clamping members unlocked the rotatable member received in the clamping members is rotatable about the rotation axis;
a synchronizing mechanism connected to the extension rods of the first and second extendable members and operable to simultaneously rotate the extension rods of the first and second extendable members to adjust an extended length of the first and second extendable portions such that the extended length of the first extendable portion and the extended length of the second extendable portion are equal; and
wherein the rotatable member includes at least one attachment element having a first end and a second end;
the first end operatively attached to the rotatable member; and
the second end configured to receive a repositionable member such that the repositionable member is repositionable by at least one of rotation of the rotatable member and adjustment of the extended length of the first and second extendable members.

20. The adjusting device of claim 19, wherein:
the repositionable member is a feed screw;
the adjusting device is configured for attachment to a feed conveyor including a conveying surface such that the position of the feed screw relative to the conveying surface is adjustable by the adjusting device.

* * * * *